(12) United States Patent
Jafarian et al.

(10) Patent No.: US 9,668,169 B2
(45) Date of Patent: May 30, 2017

(54) BANDWIDTH INDICATION IN A FRAME

(71) Applicant: QUALCOMM Incorporated, San Diego, CA (US)

(72) Inventors: Amin Jafarian, San Diego, CA (US); Alfred Asterjadhi, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 14/575,705

(22) Filed: Dec. 18, 2014

(65) Prior Publication Data

US 2015/0195741 A1 Jul. 9, 2015

Related U.S. Application Data

(60) Provisional application No. 61/933,161, filed on Jan. 29, 2014, provisional application No. 61/925,612, filed on Jan. 9, 2014.

(51) Int. Cl.
*H04W 28/06* (2009.01)
*H04L 12/801* (2013.01)
*H04W 28/20* (2009.01)
*H04W 84/12* (2009.01)

(52) U.S. Cl.
CPC .......... *H04W 28/065* (2013.01); *H04L 47/29* (2013.01); *H04W 28/20* (2013.01); *H04W 84/12* (2013.01)

(58) Field of Classification Search
CPC ... H04W 28/065; H04W 28/20; H04W 84/12; H04L 47/29

USPC ......................................... 370/310, 328, 338
See application file for complete search history.

(56) References Cited

U.S. PATENT DOCUMENTS

| 2003/0112766 | A1* | 6/2003 | Riedel ................ H04L 12/5695 370/252 |
| 2011/0207488 | A1 | 8/2011 | Gong |
| 2012/0314673 | A1 | 12/2012 | Noh et al. |

OTHER PUBLICATIONS

International Search Report and Written Opinion—PCT/US2014/071418—ISA/EPO—Mar. 16, 2015.

* cited by examiner

*Primary Examiner* — Obaidul Huq
(74) *Attorney, Agent, or Firm* — Patterson & Sheridan (57) ABSTRACT

Systems and methods for wireless communications are disclosed. More particularly, aspects generally relate to techniques for indicating a minimum and maximum channel bandwidth in a frame (e.g., short frame). One or more bits in the frame, for example a management frame, may indicate both minimum and maximum bandwidths for communicating in the network. According to aspects, a wireless terminal may determine the minimum and maximum bandwidths for communicating in the network based on a mapping of different values of the one or more bits to combinations of minimum and maximum bandwidths. While any field in the frame may indicate the minimum and maximum bandwidth, according to aspects, the Basic Service Set (BSS) bandwidth (BW) field may be used for the indication.

34 Claims, 8 Drawing Sheets

| Row | Min BSS BW (MHz) | Max BSS BW (MHz) |
|---|---|---|
| 0 | 1 | 2 |
| 1 | 1 | 4 |
| 2 | 1 | 8 |
| 3 | 1 | 16 |
| 4 | Min and Max BSS BW are equal (e.g., based on the BW of the PPDU carrying the BW bits) | |
| 5 | 2 | 4 |
| 6 | 2 | 8 |
| 7 | 2 | 16 |

BANDWIDTH INDICATION IN A FRAME

CROSS-REFERENCE TO RELATED APPLICATIONS

This application claims benefit of priority to U.S. Application Ser. No. 61/925,612, filed Jan. 9, 2014 and U.S. Application Ser. No. 61/933,161, filed Jan. 29, 2014, both of which are expressly incorporated herein by reference in their entirety.

BACKGROUND

Field of the Disclosure

Certain aspects of the present disclosure generally relate to wireless communications and, more particularly, to Basic Service Set (BSS) bandwidth (BW) indication in a frame (e.g., a short frame).

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than wireless ranges associated with frequency ranges of other IEEE 802.11 technologies and potentially fewer issues associated with path losses due to obstructions.

SUMMARY

Each of various implementations of systems, methods, and devices within the scope of the appended claims has one or more aspects and no single aspect is solely responsible for desirable attributes described herein. Without limiting the scope of the appended claims, certain features are described herein. In view of this discussion, and, particularly of the "Detailed Description," one will understand how features of various aspects allow generating and transmitting, by a device, such as an access point, a frame that indicates both minimum and maximum bandwidths for communication in a network. Furthermore, one will understand how various aspects allow determining, by a device, such as a user equipment, both minimum and maximum bandwidths for communicating in the network based on a frame received from the access point.

Aspects of the present disclosure provide an apparatus for wireless communications. The apparatus generally includes a processing system configured to generate a frame having one or more bits that indicate both a minimum bandwidth and a maximum bandwidth for communicating in a network and an interface configured to output the frame for transmission in the network.

Aspects of the present disclosure provide an apparatus for wireless communications. The apparatus generally includes an interface configured to obtain a frame transmitted in a network and a processing system configured to determine, based on one or more bits in the frame, both a minimum bandwidth and a maximum bandwidth for communicating in the network.

Aspects of the present disclosure provide a method for wireless communications. The method generally includes generating a frame having one or more bits that indicate both a minimum bandwidth and a maximum bandwidth for communicating in a network and outputting the frame for transmission in the network.

Aspects of the present disclosure provide a method for wireless communications. The method generally includes obtaining a frame transmitted in a network and determining, based on one or more bits in the frame, both a minimum bandwidth and a maximum bandwidth for communicating in the network.

Aspects of the present disclosure provide an apparatus for wireless communications. The apparatus generally includes means for generating a frame having one or more bits that indicate both a minimum bandwidth and a maximum bandwidth for communicating in a network and means for outputting the frame for transmission in the network.

Aspects of the present disclosure provide an apparatus for wireless communications. The apparatus generally includes means for obtaining a frame transmitted in a network and means for determining, based on one or more bits in the frame, both a minimum bandwidth and a maximum bandwidth for communicating in the network.

Aspects of the present disclosure provide an access point comprising at least one antenna, a processing system configured to generate a frame having one or more bits that indicate both a minimum bandwidth and a maximum bandwidth for communicating in a network and outputting the frame for transmission in the network, and a transmitter configured to transmit, via the at least one antenna, the frame for transmission in the network.

Aspects of the present disclosure provide a wireless station comprising at least one antenna, a receiver configured to receive, via the at least one antenna, a frame transmitted in a network, and a processing system configured to determine, based on one or more bits in the frame, both a minimum bandwidth and a maximum bandwidth for communicating in the network.

Aspects of the present disclosure provide a computer program product for wireless communications. The computer program product generally includes a computer readable medium having instructions stored thereon for generating a frame having one or more bits that indicate both a minimum bandwidth and a maximum bandwidth for communicating in a network and outputting the frame for transmission in the network.

Aspects of the present disclosure provide a computer program product for wireless communications. The computer program product generally includes a computer readable medium having instructions stored thereon for obtaining a frame transmitted in a network and determining, based on one or more bits in the frame, both a minimum bandwidth and a maximum bandwidth for communicating in the network.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure generally relate to techniques for indicating minimum and maximum channel bandwidths in a frame such as a short frame. As will be described in more detail herein, one or more bits in the frame may indicate both minimum and maximum bandwidths for communicating in a network. While it is envisioned that the techniques described herein may be applied to any type of frame, specific examples of management frames are provided. Two examples of management frames are a beacon frame and a probe response frame.

According to other aspects, a wireless terminal may determine minimum and maximum bandwidths for communicating in a network based on a mapping of different values of bits in the frame to combinations of minimum and maximum bandwidths. While any field in the frame may indicate the minimum and maximum bandwidths, according to some aspects, the Basic Service Set (BSS) bandwidth (BW) field may be used for the indication of minimum and maximum bandwidths.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system and Single-Carrier Frequency Division Multiple Access (SC-FDMA) systems. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal. A wireless node may provide, for example, connectivity for or to a network (e.g., a wide area network such as the Internet or a cellular network) via a wired or wireless communication link.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium.

Figure 1:
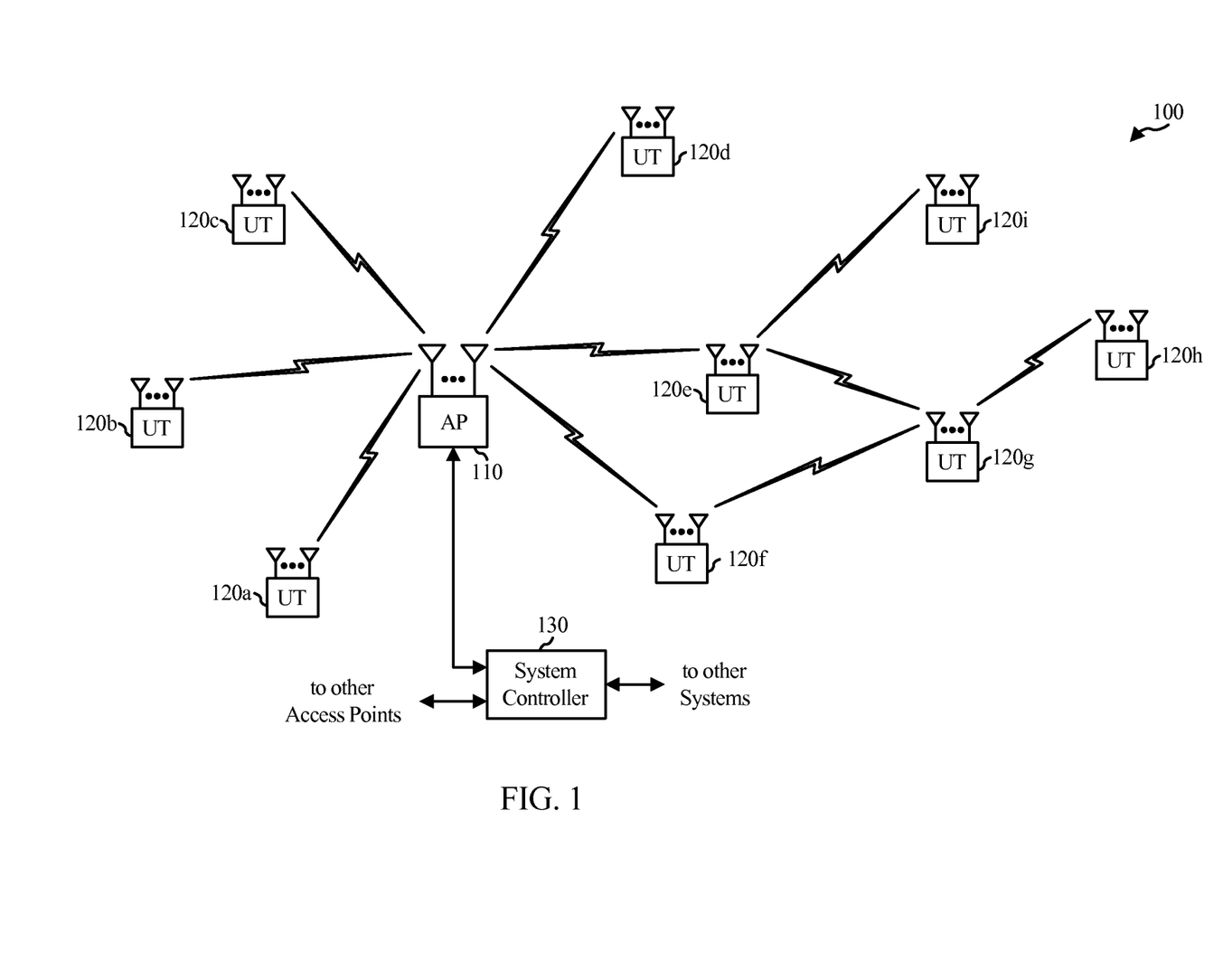
FIG. 1 illustrates a diagram of an example wireless communications network, in accordance with certain aspects of the present disclosure.

FIG. 1 illustrates an example wireless communication system in which aspects of the present disclosure may be practiced. For example, AP 110 may be configured to generate and transmit a frame having one or more bits that indicate both minimum and maximum bandwidths for communicating in a network. UT 120 may be configured to obtain (e.g., receive) the frame and determine, based on the one or more bits in the frame, both the minimum and maximum bandwidths for communicating in the network.

FIG. 1 illustrates a multiple-access multiple-input, multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, a user equipment, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
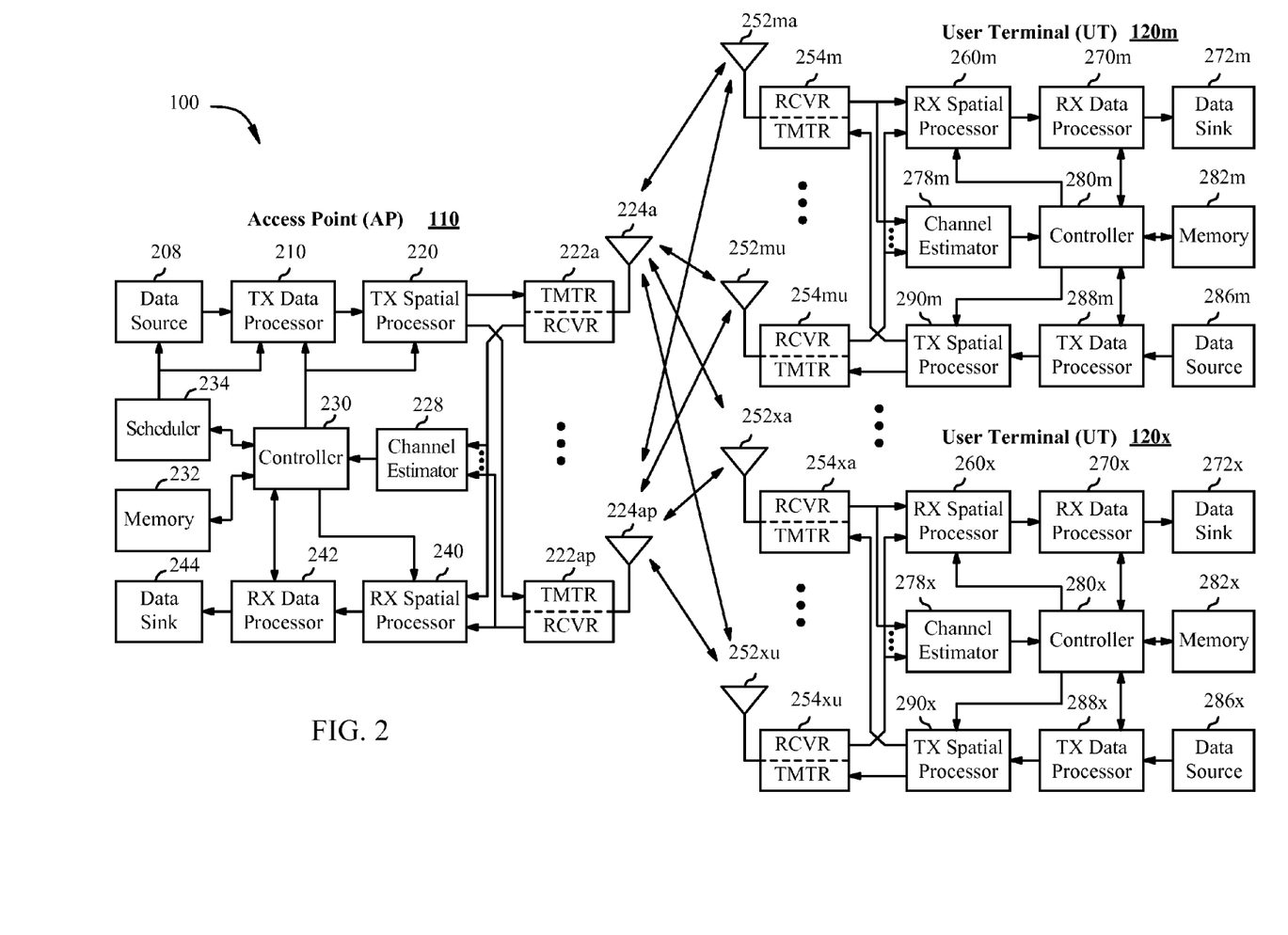
FIG. 2 illustrates a block diagram of an example access point and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 may be used to perform the operations described herein and illustrated with reference to FIGS. 6 and 6A. Similarly, antenna 252, Tx/Rx 254, processors 260, 270, 288, and 290, and/or controller 280 may be used to perform the operations described herein and illustrated with reference to FIGS. 7 and 7A.

FIG. 2 illustrates a block diagram of access point 110 and two user terminals 120m and 120x in MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal. The decoded data for each user terminal may be provided to a data sink 272 for storage and/or a controller 280 for further processing.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
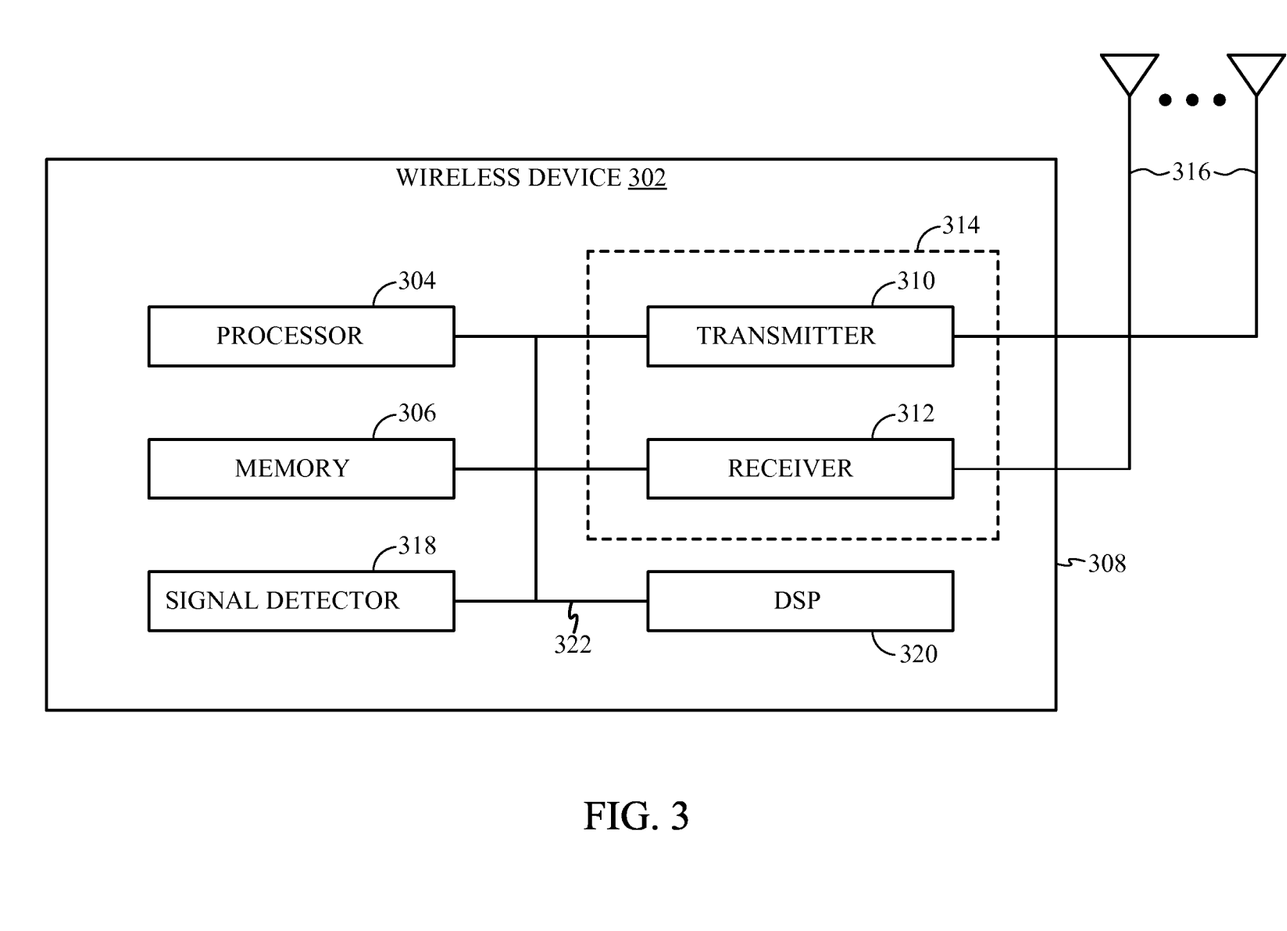
FIG. 3 illustrates a block diagram of an example wireless device, in accordance with certain aspects of the present disclosure.

FIG. 3 illustrates example components that may be utilized in the AP 110 and/or UT 120 to implement aspects of the present disclosure. For example, the transmitter 310, antenna(s) 316, processor 304 and/or the DSP 320 may be used to practice aspects of the present disclosure implemented by the AP. Further, the receiver 312, antenna(s) 316, processor 304 and/or the DSP 320 may be used to practice aspects of the present disclosure implemented by the UT.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

BSS Bandwidth Indication in a Frame

Management frames enable UEs to establish and maintain communications in a network. Two examples of management frames include a beacon frame and a probe response frame. A beacon frame, for example, may be transmitted periodically by an AP and may contain the service set identifier (SSID), timestamp, and/or other pertinent information regarding the AP. A probe response frame may be transmitted by an AP in response to a received probe request received from a UE. The probe response frame may include, for example, the SSID, supported data rates, encryption types if required, and other capabilities of the AP.

Figure 4:
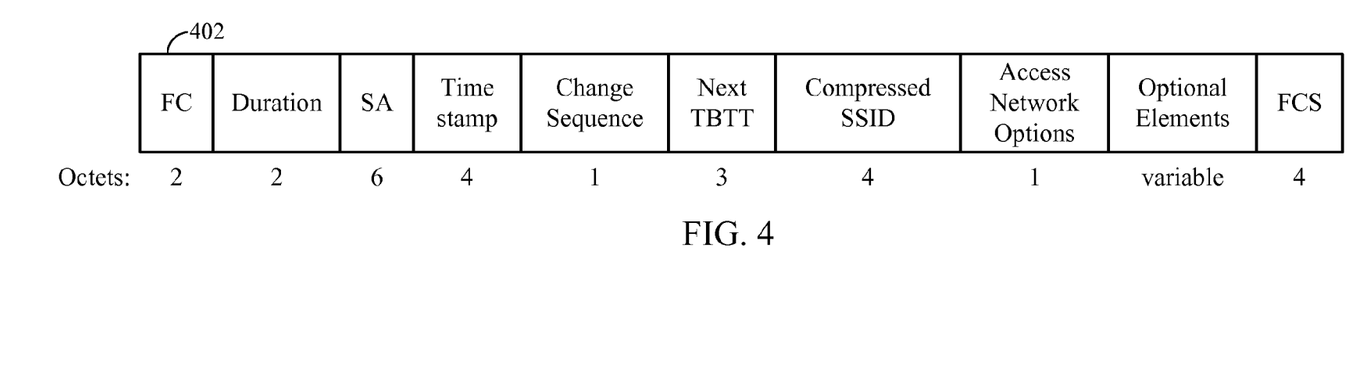
FIG. 4 illustrates an example Short Beacon frame format, in accordance with certain aspects of the present disclosure.

FIG. 4 illustrates an example of a short beacon frame 400. As illustrated in FIG. 4, a short beacon frame may include a frame control (FC) field 402.

Figure 4A:
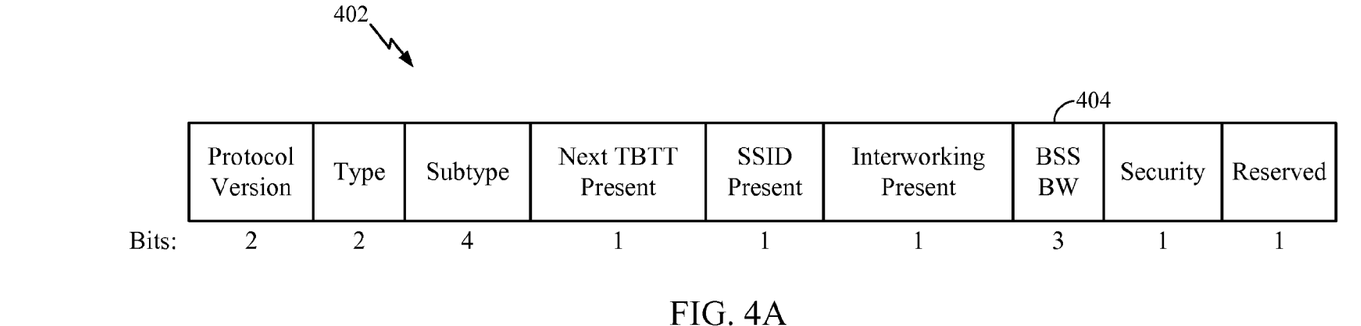
FIG. 4A illustrates an example Frame Control field format of the short beacon frame, in accordance with certain aspects of the present disclosure.

FIG. 4A illustrates an example format of the FC field 402 of the short beacon frame 400. As illustrated, the FC field may include a Basic Service Set (BSS) Bandwidth (BW) field 404. The BSS BW field 404 may be comprised of three bits to indicate a bandwidth of a particular transmission in a BSS (e.g., the bandwidth in which the BSS operates).

Figure 5:
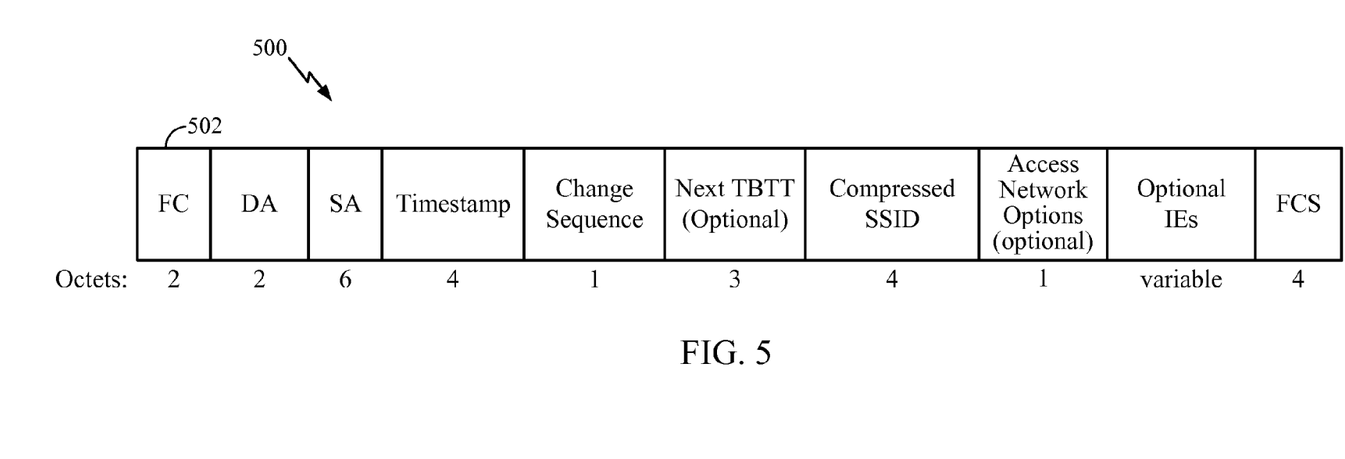
FIG. 5 illustrates an example Short Probe Response frame format, in accordance with certain aspects of the present disclosure.

FIG. 5 illustrates an example of a short probe response frame 500. As illustrated in FIG. 5, the short probe response frame may include a frame control (FC) field 502.

Figure 5A:
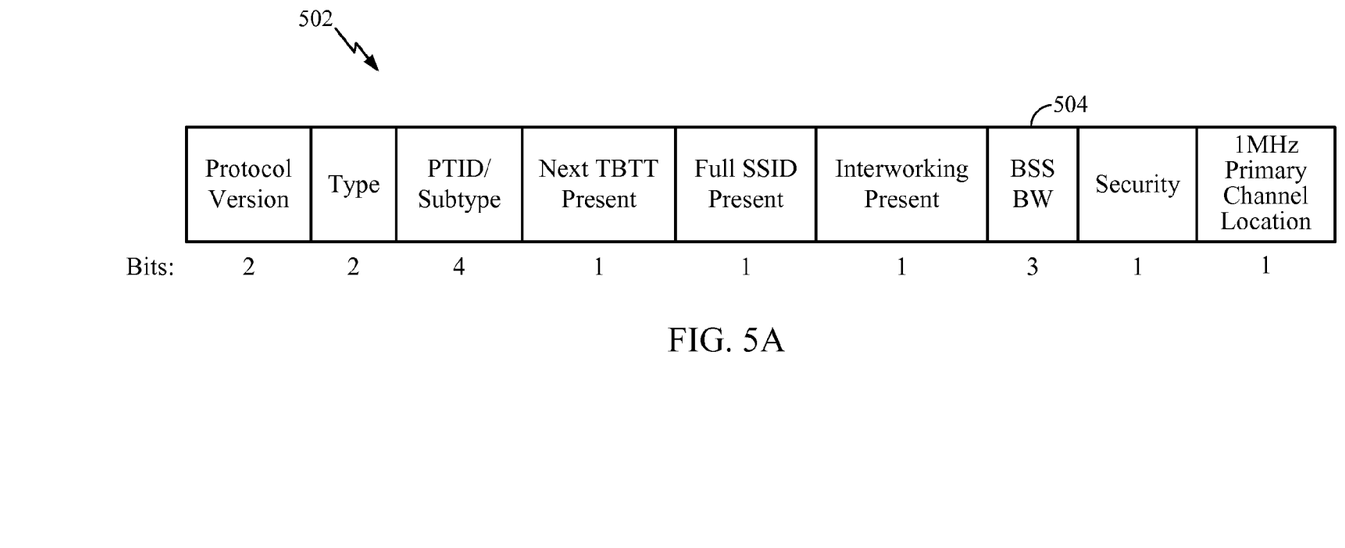
FIG. 5A illustrates an example Frame Control field format of the short probe response frame, in accordance with certain aspects of the present disclosure.

FIG. 5A illustrates an example format of the FC field 502 of the short probe response frame 500. As illustrated, the FC field 502 may include a Basic Service Set (BSS) Bandwidth (BW) field 504. The BSS BW field 504 may be comprised of three bits to indicate a bandwidth of a particular transmission in a BSS (e.g., the bandwidth in which the BSS operates).

In some systems, the BSS BW field (e.g., 404, 504) may be used to indicate the maximum load bandwidth of a transmission in a BSS. Aspects of the present disclosure, however, may allow the BSS BW field to indicate both a maximum bandwidth and a minimum bandwidth for the BSS. While FIGS. 4-4A and 5-5A illustrate example frames in which the BSS BW field may be used to indicate both maximum and minimum bandwidths for a BSS, the techniques described herein may be applied to any frame that includes a BW information field.

Figure 6:
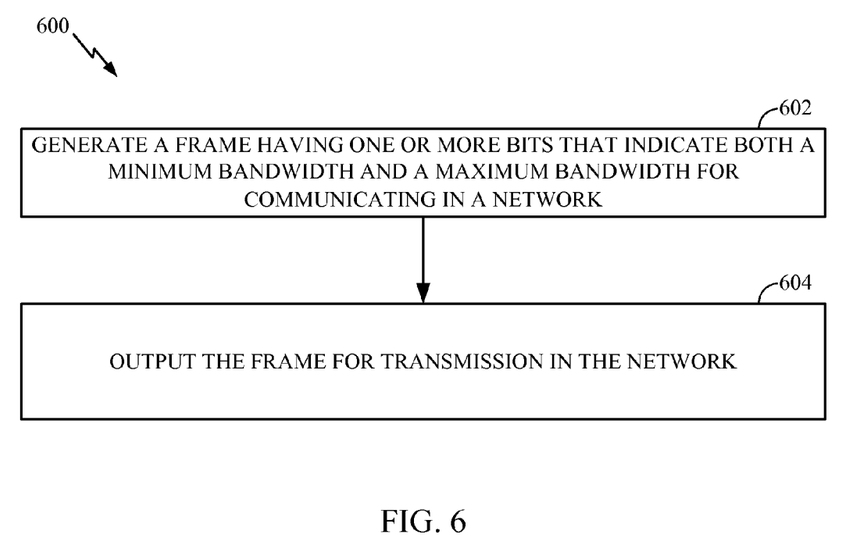
FIG. 6 illustrates a block diagram of example operations for wireless communications by an apparatus, in accordance with certain aspects of the present disclosure.
Figure 6A:
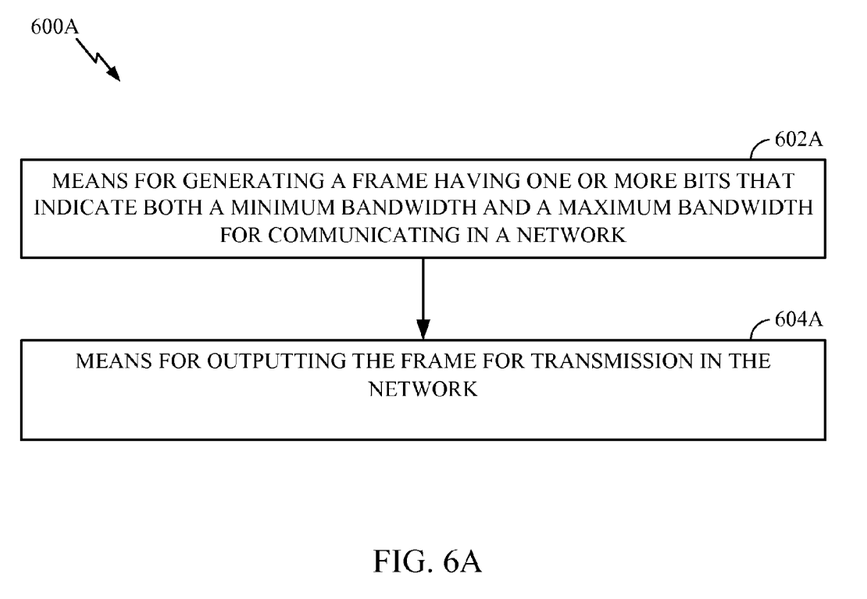
FIG. 6A illustrates example means capable of performing the operations shown in FIG. 6.

FIG. 6 illustrates example operations 600 for communicating in a wireless network according to certain aspects of the disclosure. The operations 600 may be applied to any type of frame carrying a BW indication. The operations 600 may be performed by an access point, such as AP 110 as illustrated in FIGS. 1, 2, and 3.

The operations 600 begin at 602 by generating a frame having one or more bits that indicate both a minimum bandwidth and a maximum bandwidth for communicating in a network. At 604, the frame is output for transmission in the network.

As described above, according to an example, the frame may include any type of management frame, including a beacon frame or a probe response frame. According to aspects, different values of the one or more bits may map to different combinations of minimum and maximum bandwidths.

Due to the limited number of combinations that may be signaled using the bits, a one-to-many mapping may be used for at least one of the different values of bits. For example, as will be described below with reference to FIG. 8, at least one of the values may map to multiple combinations (e.g., at least two combinations) of minimum and maximum bandwidths. According to these aspects, and as will be described in more detail below, the multiple combinations of minimum and maximum bandwidths that are signaled using the same values of bits may include combinations for which the minimum bandwidth is the same as the maximum bandwidth.

Figure 7:
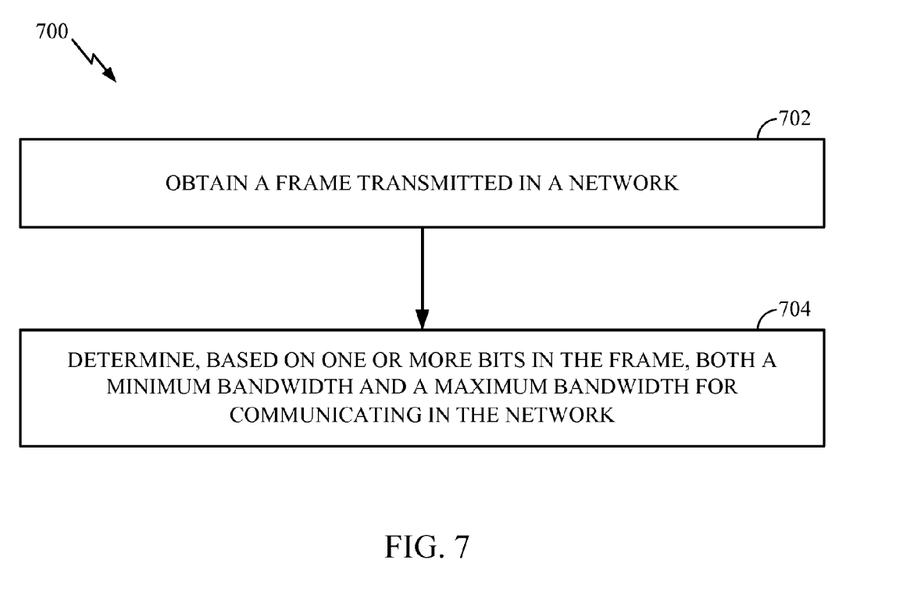
FIG. 7 illustrates a block diagram of example operations for wireless communications by a wireless device, in accordance with certain aspects of the present disclosure.
Figure 7A:
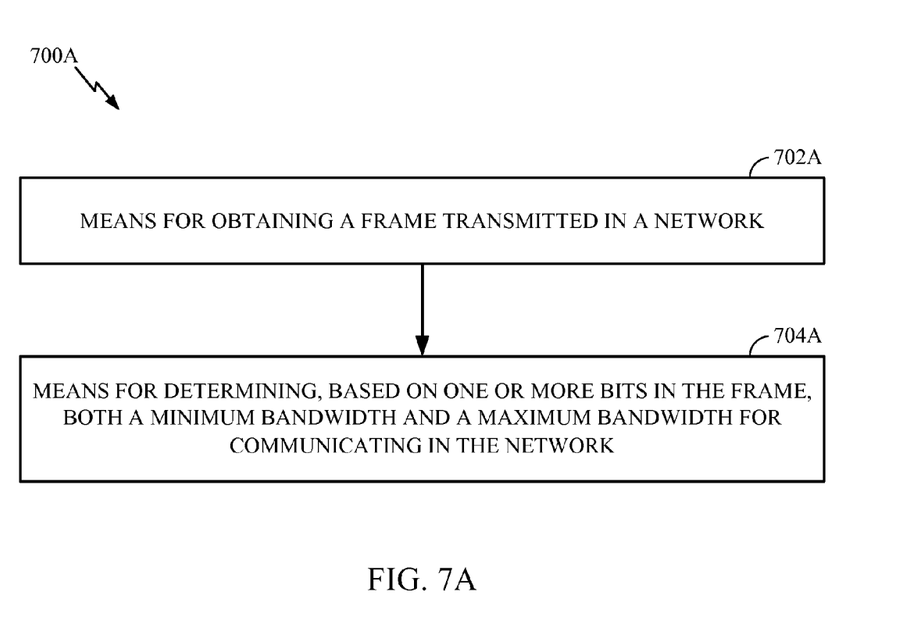
FIG. 7A illustrates example means capable of performing the operations shown in FIG. 7.

FIG. 7 illustrates example operations 700 for communicating in a wireless network according to certain aspects of the disclosure. The operations 700 may be performed by a wireless station, including for example, UT 120 as illustrated in FIGS. 1, 2, and 3.

The operations 700 begin at 702 by obtaining a frame transmitted in a network. The frame may include any type of frame carrying a BW indication that specifies both maximum and minimum bandwidths.

At 704, both a minimum bandwidth and a maximum bandwidth for communicating in the network are determined, based on one or more bits included in the frame.

As described above, the obtained frame may be any type of frame such as a management frame. The wireless station may determine the minimum and maximum bandwidths based on mapping different values of the one or more bits to different combinations of minimum and maximum bandwidths.

As described above, at least one of the different values of bits may map to multiple combinations (e.g., at least two combinations) of minimum and maximum bandwidths. The at least two different combinations of minimum and maximum bandwidths that map to the same values of one or more bits in the frame may each include combinations where the minimum bandwidth is the same as the maximum bandwidth.

Figure 8:
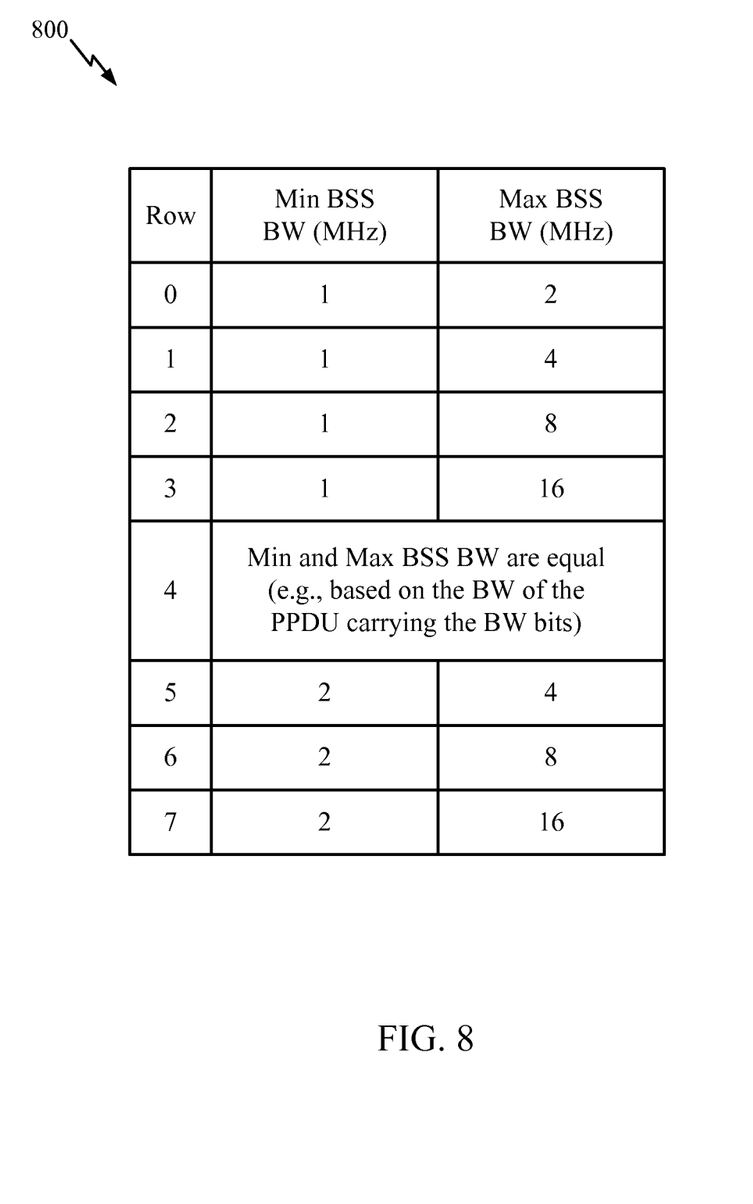
FIG. 8 illustrates an example of different combinations of minimum and maximum bandwidths, in accordance with certain aspects of the present disclosure.

FIG. 8 illustrates different combinations 800 that may exist for minimum and maximum bandwidths, according to aspects of the present disclosure. According to certain aspects, since a minimum bandwidth may not be more than a maximum bandwidth, certain combinations may not be valid. However, there may still be more valid combinations of minimum and maximum bandwidths than different values for the bit field used to signal the minimum and maximum bandwidths for communicating in the network. As shown in FIG. 8, the minimum bandwidth may be 1 or 2 MHz, and the maximum bandwidth may be 1, 2, 4, 8, or 16 MHz. According to certain aspects of the disclosure, different values of the one or more bits may map to different combinations of minimum and maximum bandwidths.

Further, as shown in Row 4 of FIG. 8, one combination of the one or more bits in a transmitted frame may map to multiple minimum and maximum bandwidth combinations. According to this one-to-many mapping, one combination of bit values (e.g., corresponding to a value of 4 in this example) may map to multiple combinations of minimum and maximum bandwidths (e.g., with both minimum and maximum bandwidths being 1 MHz or both being 2 MHz). In some cases, the wireless station may determine which of the multiple bandwidth combinations to use based on the bandwidth used by the AP for transmitting the frame (e.g., physical protocol data unit, PPDU) containing the BW indication. For example, if the frame is transmitted at 1 MHz, the station may consider the maximum and minimum bandwidths to both be 1 MHz.

The techniques described above with reference to beacon frames and probe response frames as two examples of short frames (e.g., management frames) which may indicate both a minimum and maximum bandwidth for communicating in a network may be more generally applied to any type of frame. Further, the information regarding minimum and maximum bandwidths (e.g., with bandwidth indication encoding as described above) may be conveyed with one or more bits in any field or element included in the frame.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600 and 700 illustrated in FIGS. 6 and 7 correspond to means 600A and 700A illustrated in FIGS. 6A and 7A.

Means for generating may include a processing system, which may include one or more processors, such as the processors 210, 242, and/or the controller 230 of the access point 110 illustrated in FIG. 2 or the processor 304 and/or the DSP 320 portrayed in FIG. 3. The means for outputting (e.g., transmitting) may comprise a transmitter (e.g., the transmitter unit 222) and/or an antenna(s) 224 of the access point 110 illustrated in FIG. 2 or the transmitter 310 and/or antenna(s) 316 depicted in FIG. 3.

Means for obtaining (e.g., receiving) may comprise a receiver (e.g., the receiver unit 254) and/or an antenna(s) 252 of the UT 120 illustrated in FIG. 2 or the receiver 312 and/or antenna(s) 316 depicted in FIG. 3. Means for determining may include a processing system, which may include one or more processors such as processors 260, 270, 288, and 290 and/or the controller 280 of the UT 120 or the processor 304 and/or the DSP 320 portrayed in FIG. 3.

According to certain aspects, such means may be implemented by processing systems configured to perform the corresponding functions by implementing various algorithms (e.g., in hardware or by executing software instructions) described above.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Furthermore, "determining" may include resolving, selecting, choosing, establishing and the like.

As used herein, the term "outputting" may involve actual transmission or output of a structure from one entity (e.g., a processing system) to another entity (e.g., an RF front end or modem) for transmission. As used herein, the term "obtaining" may involve actual receiving of a structure transmitted over the air or obtaining the structure by one entity (e.g., a processing system) from another entity (e.g., an RF front end or modem).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the Physical (PHY) layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may comprise a computer-readable medium having instructions stored (and/or encoded) thereon, the instructions being executable by one or more processors to perform the operations described herein and be embodied in a computer-program product. The computer-program product may comprise packaging materials to advertise the computer-readable medium therein for purchase by consumers.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
generating a frame having one or more bits that indicate both a minimum bandwidth and a maximum bandwidth for communicating in a network, wherein different values of the one or more bits map to different combinations of minimum and maximum bandwidths, and wherein at least one of the different values maps to at least two different combinations of minimum and maximum bandwidths; and outputting the frame for transmission in the network.

2. The method of claim 1, wherein the frame comprises a management frame.

3. The method of claim 1, wherein the frame comprises one of a beacon frame or a probe response frame.

4. The method of claim 1, wherein:
the minimum bandwidth is the same as the maximum bandwidth for each of the at least two different combinations.

5. The method of claim 1, further comprising indicating which of the at least two different combinations to use based on a bandwidth to be used to transmit the frame.

6. The method of claim 1, wherein the one or more bits comprise 3 bits.

7. The method of claim 6, wherein the 3 bits comprise 3 bits of a basic service set (BSS) bandwidth (BW) field.

8. A method for wireless communications, comprising:
obtaining a frame transmitted in a network;
determining, based on one or more bits in the frame, both a minimum bandwidth and a maximum bandwidth for communicating in the network, wherein the determination is made based on a mapping of different values of the one or more bits to different combinations of minimum and maximum bandwidths, and wherein at least one of the different values maps to at least two different combinations of minimum and maximum bandwidths; and
outputting for communication in the network based, at least in part, on the determination.

9. The method of claim 8, wherein the frame comprises a management frame.

10. The method of claim 8, wherein the frame comprises one of a beacon frame or a probe response frame.

11. The method of claim 8, wherein:
the minimum bandwidth is the same as the maximum bandwidth for each of the at least two different combinations.

12. The method of claim 8, further comprising:
determining which of the at least two different combinations to use based on a bandwidth on which the frame was obtained.

13. The method of claim 8, wherein the one or more bits comprise 3 bits.

14. The method of claim 13, wherein the 3 bits comprise 3 bits of a basic service set (BSS) bandwidth (BW) field.

15. An apparatus for wireless communications, comprising:
a processing system configured to generate a frame having one or more bits that indicate both a minimum bandwidth and a maximum bandwidth for communicating in a network, wherein different values of the one or more bits map to different combinations of minimum and maximum bandwidths, and wherein at least one of the different values maps to at least two different combinations of minimum and maximum bandwidths; and
an interface for outputting the frame for transmission in the network.

16. The apparatus of claim 15, wherein the frame comprises a management frame.

17. The apparatus of claim 15, wherein the frame comprises one of a beacon frame or a probe response frame.

18. The apparatus of claim 15, wherein:
the minimum bandwidth is the same as the maximum bandwidth for each of the at least two different combinations.

19. The apparatus of claim 15, wherein the processing system of the apparatus is further configured to indicate which of the at least two different combinations to use based on a bandwidth to be used to transmit the frame.

20. The apparatus of claim 15, wherein the one or more bits comprise 3 bits.

21. The apparatus of claim 20, wherein the 3 bits comprise 3 bits of a basic service set (BSS) bandwidth (BW) field.

22. An apparatus for wireless communications, comprising:
an interface configured to obtain a frame transmitted in a network; and
a processing system configured to determine, based on one or more bits in the frame, both a minimum bandwidth and a maximum bandwidth for communicating in the network, wherein the determination is made based on a mapping of different values of the one or more bits to different combinations of minimum and maximum bandwidths, and wherein at least one of the different values maps to at least two different combinations of minimum and maximum bandwidths, and output for communication in the network based, at least in part, on the determination.

23. The apparatus of claim 22, wherein the frame comprises a management frame.

24. The apparatus of claim 22, wherein the frame comprises one or a beacon frame or a probe response frame.

25. The apparatus of claim 22, wherein:
the minimum bandwidth is the same as the maximum bandwidth for each of the at least two different combinations.

26. The apparatus of claim 22, wherein the processing system of the apparatus is further configured to determine which of the at least two different combinations to use based on a bandwidth on which the frame was obtained.

27. The apparatus of claim 22, wherein the one or more bits comprise 3 bits.

28. The apparatus of claim 27, wherein the 3 bits comprise 3 bits of a basic service set (BSS) bandwidth (BW) field.

29. An apparatus for wireless communications, comprising:
means for generating a frame having one or more bits that indicate both a minimum bandwidth and a maximum bandwidth for communicating in a network, wherein different values of the one or more bits map to different combinations of minimum and maximum bandwidths, and wherein at least one of the different values maps to at least two different combinations of minimum and maximum bandwidths; and
means for outputting the frame for transmission in the network.

30. An apparatus for wireless communications, comprising:
means for obtaining a frame transmitted in a network;
means for determining, based on one or more bits in the frame, both a minimum bandwidth and a maximum bandwidth for communicating in the network, wherein the determination is made based on a mapping of different values of the one or more bits to different combinations of minimum and maximum bandwidths, and wherein at least one of the different values maps to at least two different combinations of minimum and maximum bandwidths; and means for communicating in the network based, at least in part, on the determination.

31. An access point, comprising:
a processing system configured to generate a frame having one or more bits that indicate both a minimum bandwidth and a maximum bandwidth for communicating in a network, wherein different values of the one or more bits map to different combinations of minimum and maximum bandwidths, and wherein at least one of the different values maps to at least two different combinations of minimum and maximum bandwidths; and
a transmitter configured to transmit the frame for transmission in the network.

32. A wireless station, comprising:
a receiver configured to receive a frame transmitted in a network; and
a processing system configured to determine, based on one or more bits in the frame, both a minimum bandwidth and a maximum bandwidth for communicating in the network, wherein the determination is made based on a mapping of different values of the one or more bits to different combinations of minimum and maximum bandwidths, and wherein at least one of the different values maps to at least two different combinations of minimum and maximum bandwidths, and output for communication in the network based, at least in part, on the determination.

33. A non-transitory computer readable medium having instructions stored thereon for:
generating a frame having one or more bits that indicate both a minimum bandwidth and a maximum bandwidth for communicating in a network, wherein different values of the one or more bits map to different combinations of minimum and maximum bandwidths, and wherein at least one of the different values maps to at least two different combinations of minimum and maximum bandwidths; and
outputting the frame for transmission in the network.

34. A non-transitory computer readable medium having instructions stored thereon for:
obtaining a frame transmitted in a network;
determining, based on one or more bits in the frame, both a minimum bandwidth and a maximum bandwidth for communicating in the network, wherein the determination is made based on a mapping of different values of the one or more bits to different combinations of minimum and maximum bandwidths, and wherein at least one of the different values maps to at least two different combinations of minimum and maximum bandwidths; and
communicating in the network based, at least in part, on the determination.

* * * * *